United States Patent
Taylor et al.

(10) Patent No.: US 7,243,192 B2
(45) Date of Patent: Jul. 10, 2007

(54) CACHE MEMORY ARCHITECTURE WITH SYSTEM CONTROLLER DEVICE THAT COMPARES CACHE TAGS TO MEMORY ADDRESSES RECEIVED FROM MICROPROCESSOR

(75) Inventors: Michael DeMar Taylor, San Jose, CA (US); John R. Kinsel, San Jose, CA (US); Tom Riordan, Los Altos, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 0 days.

(21) Appl. No.: 11/426,758

(22) Filed: Jun. 27, 2006

(65) Prior Publication Data

US 2006/0236020 A1    Oct. 19, 2006

Related U.S. Application Data

(62) Division of application No. 10/732,998, filed on Dec. 11, 2003, now Pat. No. 7,130,968.

(60) Provisional application No. 60/454,365, filed on Mar. 11, 2003.

(51) Int. Cl.
G06F 12/10 (2006.01)

(52) U.S. Cl. .............................. 711/140; 711/1; 711/3; 711/119; 711/150; 711/151; 711/152; 711/158; 711/168

(58) Field of Classification Search ................. 711/119, 711/140, 150, 151, 152, 158, 168
See application file for complete search history.

(56) References Cited

U.S. PATENT DOCUMENTS

| | | | |
|---|---|---|---|
| 5,235,697 A | 8/1993 | Steely, Jr. et al. | |
| 5,699,540 A | 12/1997 | Vanka et al. | |
| 5,752,045 A | 5/1998 | Chen | |
| 5,809,562 A | 9/1998 | Gaskins et al. | |
| 5,813,030 A * | 9/1998 | Tubbs | 711/118 |
| 5,905,996 A | 5/1999 | Pawlowski | |
| 5,905,997 A | 5/1999 | Stiles | |
| 6,065,097 A | 5/2000 | Feierbach et al. | |
| 6,081,871 A * | 6/2000 | Hwangbo | 711/118 |

OTHER PUBLICATIONS

Baer, J., "Computer Systems Architecture," Computer Science Press, Inc., pp. 306-307 (1980).*
Chandrakasan, A., et al., "Design of High-Performance Microprocessor Circuits," The Institute of Electrical and Electronics Engineers, Inc., IEEE Press, p. 287 (2001).*

* cited by examiner

Primary Examiner—Matthew Kim
Assistant Examiner—Hetul Patel
(74) Attorney, Agent, or Firm—Knobbe, Martens, Olson & Bear LLP

(57) ABSTRACT

A single memory element, which may consist of general purpose SRAM chips, implements both tag and data cache memory functions, resulting in an efficient, low cost implementation of high speed external cache memory. In one embodiment, a bank of general purpose RAM used by a microprocessor as an external cache memory stores both cache tags and cache data in separate memory locations. During a read operation, the microprocessor retrieves a cache tag from the bank of general purpose RAM before retrieving corresponding cache data therefrom, and compares the cache tag to a memory address to assess whether requested data resides in the cache memory. The comparison may also be performed concurrently by a system controller device, which may abort the main memory access if a cache hit is detected.

9 Claims, 8 Drawing Sheets

CACHE MEMORY ARCHITECTURE WITH SYSTEM CONTROLLER DEVICE THAT COMPARES CACHE TAGS TO MEMORY ADDRESSES RECEIVED FROM MICROPROCESSOR

RELATED APPLICATIONS

This application is a division of U.S. application Ser. No. 10/732,998, filed Dec. 11, 2003, now U.S. Pat. No. 7,130,968, which claims the benefit of U.S. Provisional Appl. No. 60/454,365, filed Mar. 11, 2003. The disclosures of the aforesaid applications are hereby incorporated by reference.

FIELD OF THE INVENTION

The present invention relates to a cache memory architecture in which cache data and tags are stored within a common external memory array, which may be implemented as a single bank of SRAM chips. The invention also relates to associated microprocessor and system controller circuitry for supporting the cache architecture.

BACKGROUND OF THE INVENTION

A cache memory provides a high speed interface between the Central Processing Unit (CPU) of a computer system and its main memory. As shown in FIG. 1, a smaller and faster cache memory provides the CPU high speed access to a larger, but slower main memory. The cache operates by maintaining a copy of those portions of the main memory's data that are likely to be used by the CPU. If the cache has the requested data, the CPU receives the data without having to incur the delay associated with a read from the main memory. The CPU does not need to know explicitly about the existence of a cache.

The simplified representation of a cache memory in FIG. 1 illustrates the basic concept of a cache. In its basic form, the cache appears to the CPU as if it were the main memory itself. That is, there is a fundamental interface between the processor and the cache memory in which the processor supplies a memory address to the cache and the cache provides the requested data back to the processor. This is the same basic function and interface that would be expected of a directly connected main memory.

Caches are, however, fundamentally different from main memories in some ways. The primary difference is that while main memory consists of sufficient random access memory to represent the entire range of allowable memory accesses by the processor, a cache memory allows for the entire range of memory addresses, while in fact consisting of a much smaller array of actual random access memory. A cache memory therefore relies on a coexistence with the main memory of the computer system to maintain the entirety of the system's memory. Because a cache memory can only store a subset of the main memory's contents, a mechanism is provided for identifying the portion of the main memory it actually contains. In addition, mechanisms are provided for replacing the cache memory's contents and for maintaining consistency with the main memory.

In the diagram of FIG. 1 there is means for data transfer between the cache and the main memory as well as means for data transfer between the CPU and the cache. While the amount of data transferred between the cache and the CPU is dictated by the instructions executed by the CPU, data transfers between the cache and main memory are in fixed block sizes. Each of these memory blocks (also called lines) residing in the cache has an associated identifier (tag) which uniquely identifies the block in the cache with its corresponding block in main memory. The cache memory also includes a means for determining whether memory accesses made by the CPU are resident in the cache, or whether they must involve an access to the main memory for servicing.

FIG. 2 shows a diagram of the primary components of a cache memory implementation. Standard cache memory systems are implemented with two distinct memory components, a tag memory element and a data memory element. As noted above, the data element contains copies of blocks of data from the system main memory. The tag element contains an identifier for each block in the data element. The tag identifies the data block by the address used to access the data in the main memory. When the CPU seeks to access an instruction or data in memory it supplies the address associated with that access to the cache memory. The cache memory system is responsible for comparing the requested address with the addresses of valid lines of data held in the cache. FIG. 2 also shows a mechanism for forwarding the address provided by the processor to the main memory as required in the event the data is not resident in the cache.

The actual implementation of a data comparison is dictated by the structural organization of the cache. Two fundamental types of cache memory organizations exist: direct mapped and associative. In a direct mapped cache, each block of main memory has a pre-assigned location in the cache memory. The comparison function for a direct mapped cache need only compare the tag associated with the pre-assigned block in the cache with the address supplied by the CPU. In an associative mapped cache organization the CPU supplied address is compared with all of the cache tags.

Most cache implementations use a hybrid of these two methods known as a set associative organization. In a set-associative mapping, each block in main memory is assigned to a set of cache blocks. When a set-associative cache is employed, the address issued by the CPU is compared with only those cache tags corresponding to the set of blocks to which the specified memory block is mapped. With all of these implementations, the tag corresponding to a cache line consists of a sufficient number of memory address bits to uniquely identify the specific block of main memory represented by the cache block, a valid bit and usually other bits to identify the particular state of the cache line. A valid match of the CPU supplied address with a valid tag address indicates that the line is present in the cache.

As pipelined processor execution speeds have increased relative to main memory access times, modern computer systems have generally utilized a plurality of cache memories. Typically a very high speed first level cache is built as part of the microprocessor block. FIG. 3 shows a conceptual diagram of a microprocessor with an on chip first level cache connected to a second level cache which in turn interfaces to the main memory. As many levels of cache as is practical may be used. Many modern microprocessors have two on chip caches and may further be built into systems which employ an off chip third level cache.

The performance of a computer memory system relates to how quickly memory accesses from the CPU are processed on average. When cache memories are used, there is a distinction of access time between cases where the data being requested is resident in the cache (a cache hit) or not (a cache miss). Cache hit performance is enhanced by making the memory access faster and by improving the hit rate. Cache design also focuses on the cost of implementation.

Cache system design involves making tradeoffs in speed, hit rate and cost. It is well documented that for general applications, the larger the cache, the better will be the hit rate, and thus the performance. However, the larger RAM arrays needed for larger caches are typically slower than smaller arrays, negating some of the potential gain from increased cache sizes. The use of associative caches or set associative caches helps to provide typically better hit rates as compared to direct mapped caches though at an additional cost in the design.

There are also definite physical barriers to desired cache implementations. The size of a cache memory built on a microprocessor chip is limited by the costs and yield loss resulting from larger die sizes. Off chip caches may more easily accommodate large cache sizes, but are limited by the restrictions on number of microprocessor chip pins that can be practically used to transfer addresses and data between the processor and the memory system. Further, a multiplicity of chips may be required to implement the off-chip cache resulting in increased system cost.

The main memory of a computer system is built with random access memory devices (RAMs). The RAMs are accessed by an address supplied by the CPU. The contents of the RAMs are either instructions to the CPU or data to be manipulated by the CPU. The data and tag elements of a cache memory system are also implemented with some form of RAM. A portion of the same address used to access the main memory is also used to access the data and tag arrays of the cache memory. A sample implementation of an external cache in a microprocessor based system is shown in FIG. 4.

The level 2 cache as represented in the diagram of FIG. 3 is represented by three distinct components in FIG. 4, a system control chip, a cache data element, and a cache tag element. In a typical system, the system control chip provides the physical link between the microprocessor and the other components of the computer system. These components include the main memory (shown) and system I/O components (not shown). The cache data memory element typically consists of a plurality of standard SRAM (static random access memory) chips. The tag memory element typically consists of one or more specialty SRAM chips that store the level 2 tags. These specialized tag RAMs include comparison circuitry for identifying whether the memory address supplied by the microprocessor matches the data resident in the level 2 cache. The result of this comparison is supplied to the microprocessor and system controller. The microprocessor uses this tag match to determine whether the requested data can be obtained from the level 2 data element. Similarly, the system controller uses the tag match indication to determine whether to continue processing the main memory access request.

Tag RAMs tend to be highly specialized to the particular application for which they are designed and thus tend to be significantly more expensive for the size of the arrays than are the more general purpose RAMs used for the data arrays. The added cost is due largely to the addition of special tag comparison circuitry, as described above. The use of tag RAMs thus adds a non-trivial additional cost to the implementation of these off chip caches.

Because of the costs associated with the implementation of off chip caches, efforts have been taken to try to achieve the benefits of these caches at reduced system cost. One such approach has been to build larger caches on the same chip as the processor. This has included the frequent use of multiple on-chip caches. The PMC RM7000 family of processors and many other microprocessors are examples of this. The existence of larger on-chip caches in many cases allows for adequate system performance without the addition of an off chip cache. In some systems, however, an off chip cache is still desirable.

Another approach has been to incorporate the tag element of an external cache memory on the processor chip itself. This avoids the need to provide a specialized tag RAM for the system. With this approach, however, the microprocessor die size is increased by the area required for the tag RAM, resulting in significantly higher manufacturing costs. In addition, the cost of the embedded tag RAM is incurred regardless of whether an external cache is actually implemented within the particular computer system.

RAM manufacturers have also made efforts to reduce the costs of tag RAMs used for off-chip cache implementations. These efforts focus on aspects of the manufacturing of the cache data and cache tag RAM chips. For example, U.S. Pat. No. 5,905,996, granted on May 18, 1999, discloses a cache design in which the tag memory is included within the same integrated circuit chip as the data memory. This approach allows the memory supplier to provide the tag and data functionality without the expense of manufacturing two separate parts. This allows the manufacturer to target the most cost effective array sizes in a given technology. This dual function chip is still somewhat specialized in that it includes the appropriate tag functionality as specified by the system requirements. As a result, these dual-function RAM devices are likely to be significantly more expensive than general purpose RAMs traditionally used for cache data arrays.

Another known approach involves increasing the width of an internal RAM array so that each cache data entry can be stored together with its associated tag bits. The tag bits corresponding to the addressed data entry are read simultaneously with the data bits. See "Design of High-performance Microprocessor Circuits," IEEE Press copyright 2001, edited by Chandrakasan, Bowhill, and Fox, page 287. (The width of a RAM array represents the number of bits of memory that can be accessed simultaneously, while the depth of the array represents the number of distinct groups of these bits that are available.)

In a direct mapped cache implementation, the width of the RAM array required to implement the data array is determined by the width of the data transfer between the cache and the processor. In the case of a set associative cache, the width of the array required is multiplied by the degree of associativity. A four way associative cache requires four times the RAM array width of a comparable direct mapped cache implementation. U.S. Pat. No. 5,905,997 granted to AMD on May 18, 1999 relates to implementing the tag bits within a portion of the array width that would ordinarily be allocated to a data array in such an associative cache. In most applications, the additional array width required for the multiplicity of associativities is provided by implementing a separate array for each degree of associativity.

In the AMD patent, a portion of one of the N RAM arrays used to implement an N way associative cache is used to provide the tags associated with the other N-1 arrays. Because this first array is used for tags, and is only partially usable for data, this approach requires that N is two or more.

Another problem with the design of a cache memory system using separate data and tag arrays is that system designers typically cannot take advantage of advances in fabrication technology unless these advances have been incorporated into both types of memories. For example, tag RAM chips that implement new electrical interface standards may not become commercially available until well after such interface standards have been incorporated into general purpose SRAM chips.

SUMMARY OF THE INVENTION

One aspect of the invention is an architecture for implementing a direct mapped cache using a single bank of RAM for the data and tag elements of the cache. Aspects of the invention may also be embodied within set associative caches. The invention eliminates the need for specialized tag functionality in the RAM arrays, allowing for the use of standard, general purpose SRAMs to store both cache tags and cache data.

In the preferred embodiment, an off chip cache is implemented with a single bank of SRAM memory chips. Control logic for the cache memory resides on the central processor chip and in the system memory controller. The processor provides the address used to access the cache and also supplies the address of the access to the system control chip.

The cache RAM address provided by the processor in the preferred embodiment is based on the main memory address (real address) as used by the processor. Rather than simply using a range of the memory address bits as is typical to cache memory applications, an address mapping function transforms the real address into either a tag or data address using a mapping function. Rather than simultaneously accessing the tag and data portions of the cache array, these are addressed sequentially allowing the depth of the RAM rather than the width to be expanded to implement both tag and data elements. Comparison circuitry is implemented on the microprocessor chip and optionally also in a system controller chip to eliminate the need for this specialized function in a separate tag RAM.

One aspect of the invention is thus a method and architecture for implementing a direct mapped cache memory system in a single bank of SRAM incorporating both tag and data elements. One practical application of the method and architecture relates to reducing the system cost of a cache memory system built outside the microprocessor chip. Standard implementations of cache memory systems use two separate memory elements, a tag element and a data element. Utilizing a single memory element to implement both tag and data cache memory functions results in an efficient, lower cost implementation of high speed cache memory.

Another aspect of the invention is a system controller device adapted to be connected between a microprocessor and a main memory and to provide an interface to the main memory. The system controller device comprises a memory interface circuit. The memory interface circuit is configured to receive a main memory address from the microprocessor over a bus that interconnects the microprocessor and the system controller device, and to use the main memory address to perform a memory read operation in which data is read from the main memory. The system controller further comprises a cache tag comparison circuit. The cache tag comparison circuit is configured to receive a cache tag value as the cache tag value is read by the microprocessor from an external cache memory that is external to the microprocessor and the system controller device. The cache tag comparison circuit is further configured to compare the cache tag value with the main memory address received by the memory interface circuit to determine whether the data associated with the memory read operation resides in said external cache memory. In addition, the cache tag comparison circuit is configured to prevent the memory interface circuit from completing the memory read operation if the comparison of the cache tag value with the main memory address reveals that said data resides in the external cache memory.

Another aspect of the invention is a method of supporting the microprocessor's use of an external cache memory. The method is implemented in a system controller device that connects the microprocessor to a main memory. The method comprises: receiving and latching a main memory address supplied to the system controller device by the microprocessor for performing a main memory read operation; receiving a cache tag as the cache tag is read by the microprocessor from the external cache memory; with a comparison circuit of the system controller device, performing a comparison of the main memory address and the cache tag to assess whether data associated with the main memory read operation resides in the external cache memory; and aborting the main memory read operation if the comparison performed with said comparison circuit of the system controller device reveals that said data resides in the external cache memory.

Neither this summary nor the following detailed description section is intended to define the invention. The invention is defined by the claims.

DETAILED DESCRIPTION OF THE PREFERRED EMBODIMENTS

A particular embodiment will now be described in which an off-chip direct mapped cache is implemented with a single bank of SRAM memory chips. Control logic for the cache memory resides on the central processor chip and in the system memory controller. The processor provides the address used to access the cache and also supplies the address of the access to the system control chip.

The cache RAM address provided by the processor is based on the main memory address (real address) as used by the processor. Rather than simply using a range of the memory address bits as is typical to cache memory applications, an address transformation circuit changes the real address into either a tag or data address using a mapping function. The mapping function distinguishes between tag accesses and data accesses. Because addresses are mapped differently for tag and data accesses, a single memory element or array (e.g., a single bank of RAM chips) may be used for both tags and data without conflict.

Figure 1:
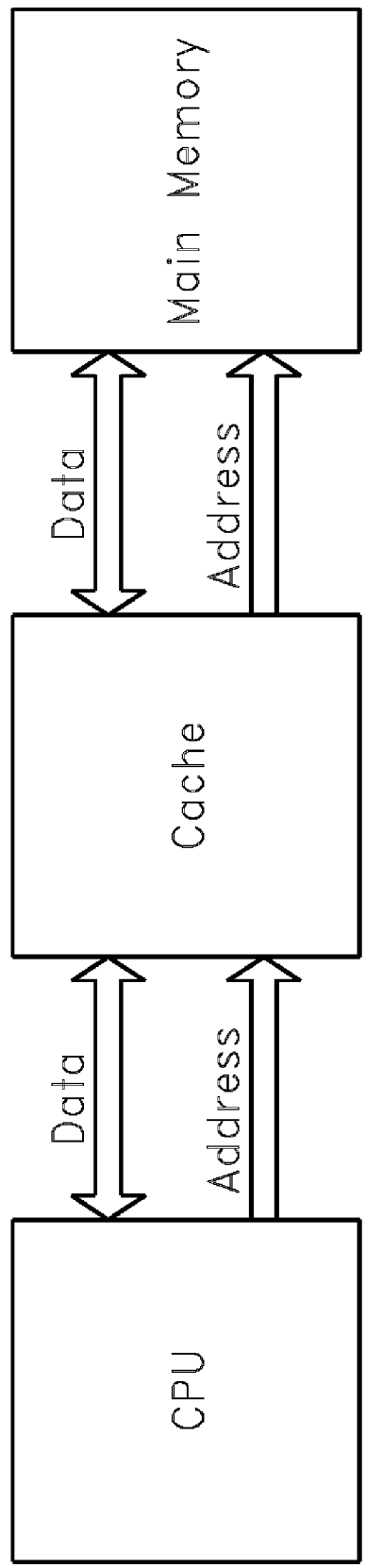
FIG. 1 illustrates the use of a cache memory between a CPU and a main memory.
Figure 2:
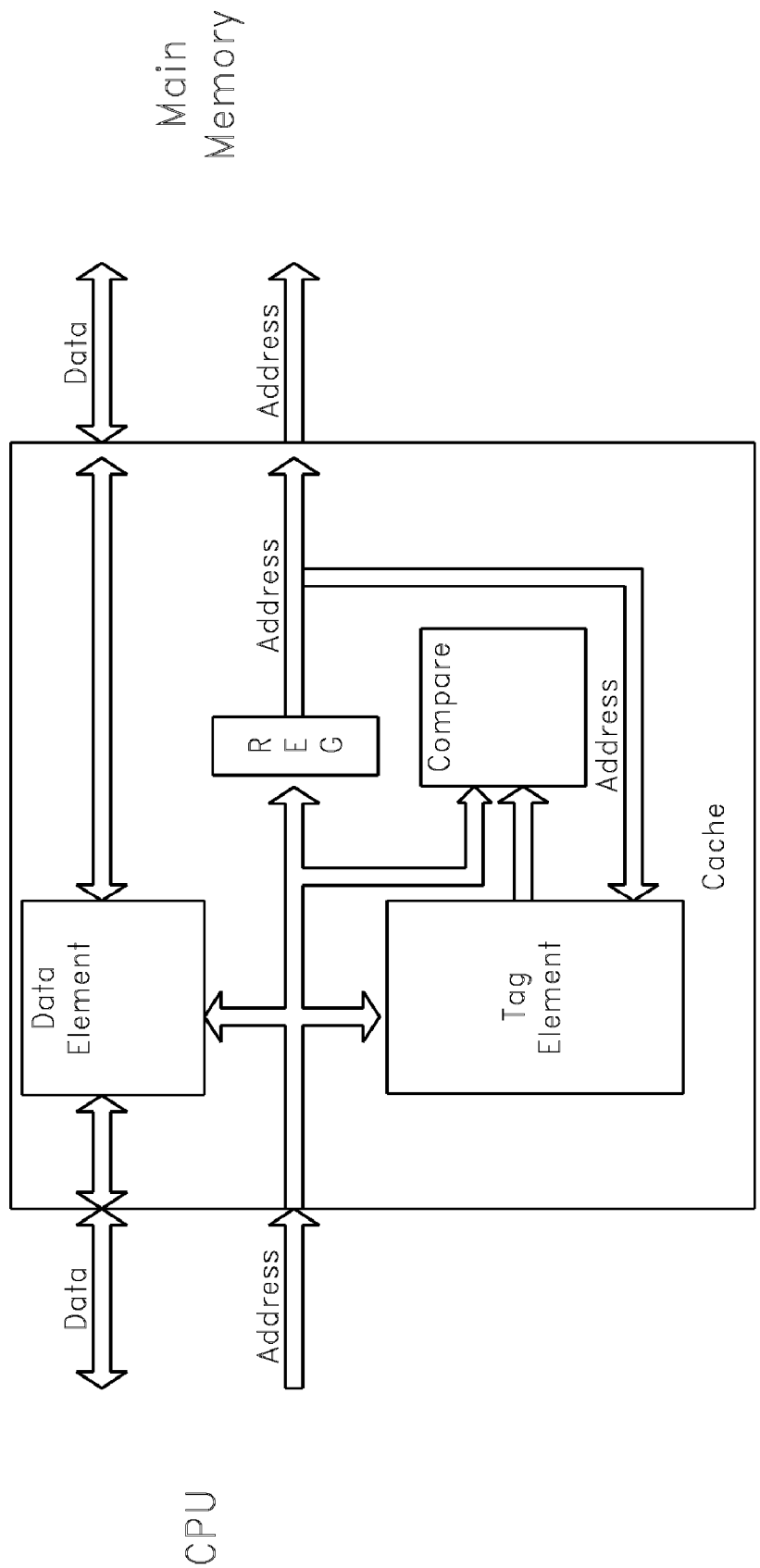
FIG. 2 is a cache memory diagram showing tag and data elements and an address comparison block.
Figure 3:
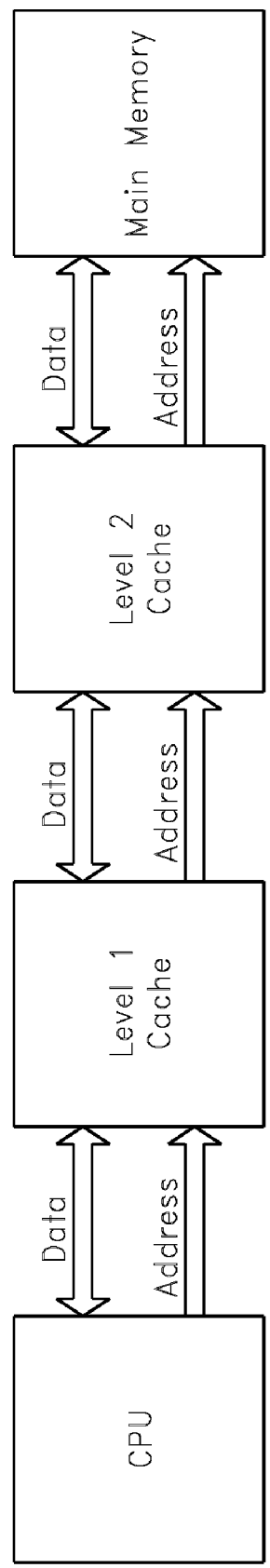
FIG. 3 illustrates the use of multiple cache memories between the CPU and the main memory.
Figure 4:
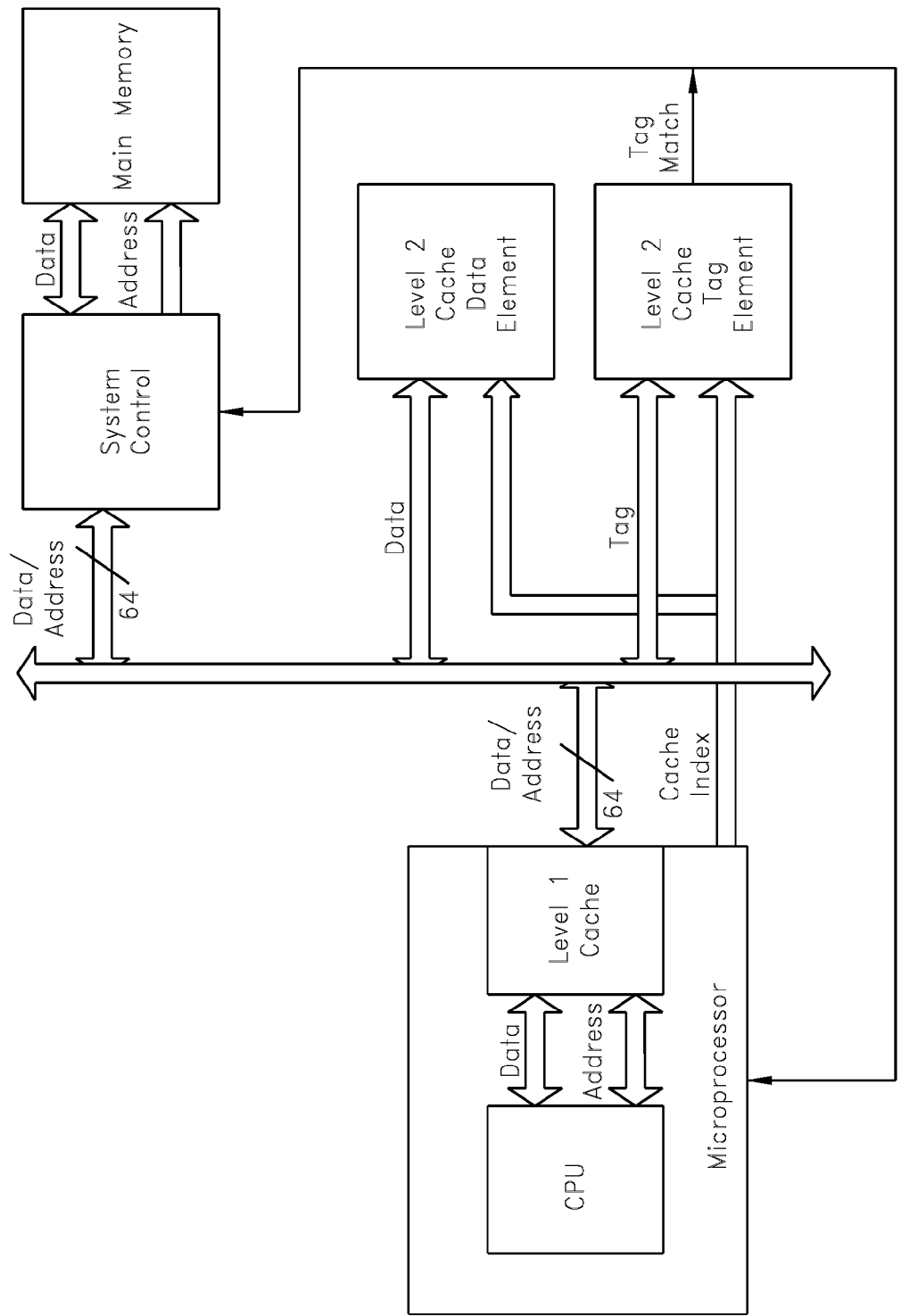
FIG. 4 illustrates a prior art implementation of an off-chip cache memory system using tag RAMs.
Figure 5:
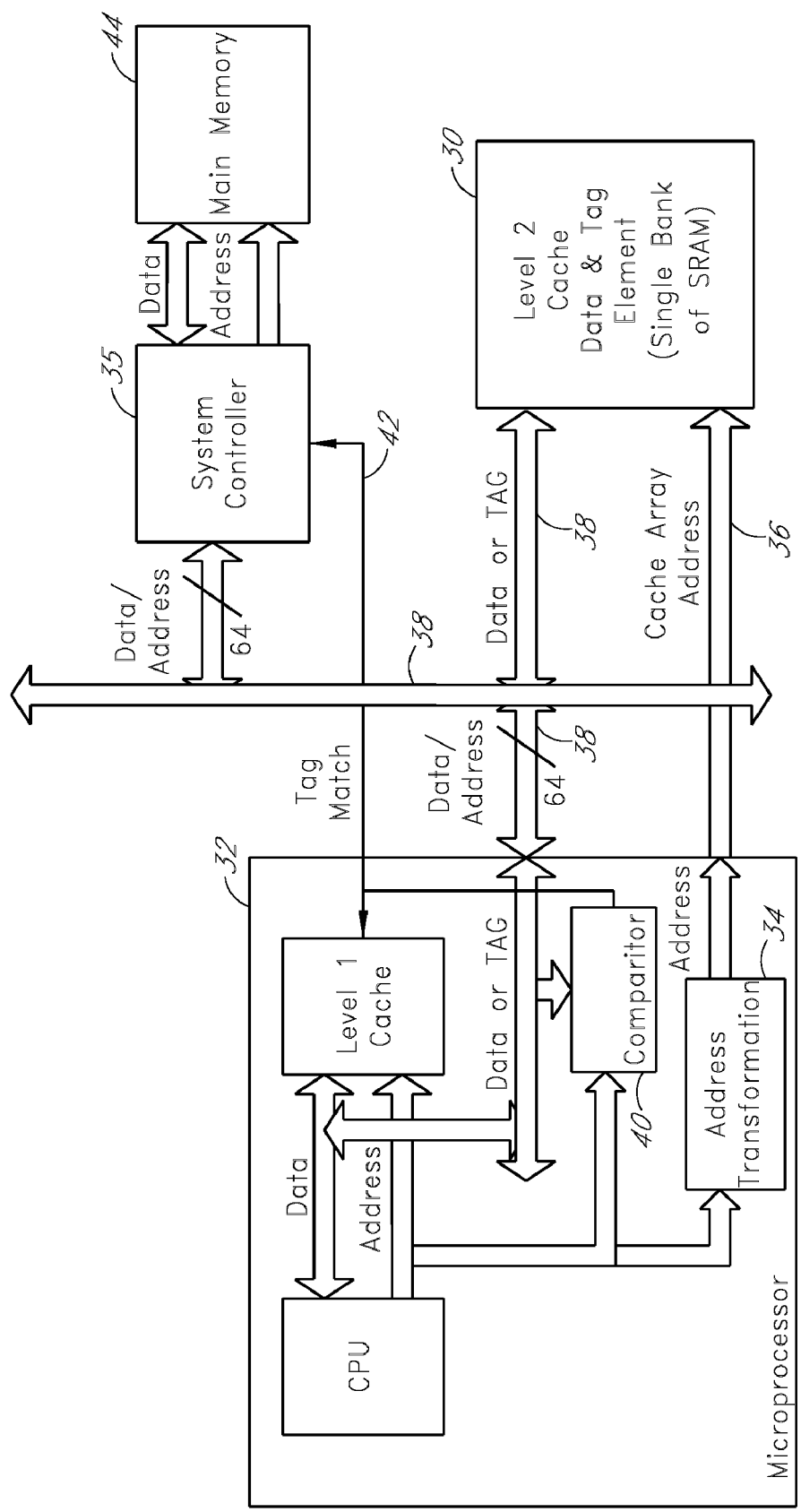
FIG. 5 illustrates an implementation of an off-chip cache memory system according to one embodiment of the invention.

The diagram of FIG. 5 shows one embodiment of the invention. FIG. 5 contains many of the same system components as in the prior art system shown in FIG. 4. Significant in FIG. 5 is the absence of the separate tag element of FIG. 4. Instead, a single level 2 data cache and tag element which may consist of general purpose SRAM chips that lack tag comparison circuitry-stores both cache tag and cache data. Unlike designs in which the tag is stored together with its associated data in the same addressable memory location, the cache tags and data are stored separately from each other in different memory locations.

As depicted in FIG. 5, the microprocessor 32 now includes an address transformation circuit 34 for transforming a CPU-supplied memory address into a cache tag address and a cache data address for accessing the combined cache tag/data element 30. As described below, the mapping function implemented by this transformation circuit 34 effectively partitions the RAM bank's memory space into a tag portion and a data portion. The microprocessor 32 also includes associated control logic (not shown) for sequentially accessing the cache memory bank 30.

During a memory read operation, the microprocessor 32 initially provides the memory read address to the system controller 35 over a shared data/address bus 38 to initiate a read from the main memory 44. In addition, the microprocessor provides the associated cache tag address (as generated by the address transformation circuit 34) on the cache array address bus 36 to read a cache tag from the cache memory bank 30. The cache tag is then read into the microprocessor 32 over the shared address/data bus 38 (together with associated state information), and is compared with the CPU-supplied memory address by a comparator 40 to determine whether the requested data resides in the level 2 cache 30. During this comparison, the microprocessor 32 places a cache data addresses on the cache array address bus 36 to begin to retrieve the associated cache data, which may or may not be valid. The cache tag and associated cache data are thus retrieved sequentially, rather than in parallel as in conventional designs. The cache data is read into the microprocessor 32 over the shared data/address bus 38.

In the illustrated embodiment of FIG. 5, the comparator 40 generates a tag match signal 42 that is passed to the system controller 35 to indicate whether the requested data resides in the level 2 cache 30. As is conventional, the system controller may abort the memory read operation if a tag match (cache hit) occurs. As described below, rather that relying on a microprocessor-generated tag match signal to make this determination, the system controller 35 may be designed to latch the cache tag as it is read from the cache memory bank 30, and perform its own comparison of the this cache tag to the main memory address.

The representation of the system controller 35 and main memory 44 is unchanged in FIG. 5 with respect to FIG. 4. It is noted, however, that the system controller 35 may be affected by the difference of approach. Specifically, the tag match signal shown driven by the tag RAM in FIG. 4 and by the microprocessor chip 32 in FIG. 5 may not have the same timing relationship with respect to the other interface signals connected to the system controller.

FIG. 5 also does not show the optional change to the system controller 35 to incorporate a duplicate comparator circuit to allow for earlier recognition of tag match. As discussed below, one benefit of this feature is that it increases the speed at which the main memory 44 may be accessed. When such a duplicate comparator is included, the system controller 35 need not include a tag match signal interface signal.

The tag & data element of FIG. 5 may be identical in construction to the data element of FIG. 4. In converting a design from a prior art implementation like that in FIG. 4 to that of FIG. 5, the depth of the RAM array can either be increased to accommodate a larger data array and the tag element, or can be kept the same size with a portion of the former data array being used to implement the tag element.

One advantage of the architecture of FIG. 5 over the design of FIG. 4 is the reduction in loading on the processor's address/data bus 38. Specifically, the FIG. 5 design eliminates the need for the address/data bus 38 to be connected to two separate cache memory elements or banks, and thereby reduces the capacitive loading on this bus. As a result, the address/data bus 38 can be operated at a higher frequency, resulting in higher system performance. The capacitive loading on the cache address bus (labeled "cache index" in FIG. 4, and "cache array address" in FIG. 5) is similarly reduced.

As mentioned above, the system controller 35 may include circuitry (see FIG. 6) for comparing the cache tag read from the cache memory 30 to the memory address supplied by the microprocessor 32. With this approach, the system memory controller 35 is connected to the same data lines (of address/data bus 38) that are connected to the cache array 30. When the processor 32 accesses the cache array 30, it also supplies the main memory address to the system controller 35 on these data lines, and provides an indication to the system controller 35 that a cache access is in process.

The system controller 35 responds by capturing the associated memory address, and thereafter capturing the tag address and state information supplied by the cache array to the processor 32. The tag comparison circuitry in the processor 32 is duplicated in the system controller 35, allowing the system controller to immediately determine whether the requested data can be retrieved from the level 2 cache. In one embodiment, the system controller 35 initiates the main memory access upon receiving the memory address from the microprocessor 32. In another embodiment, the system controller 35 waits for the result of the internal comparison, and initiates the main memory access only if a cache miss is indicated.

Figure 6:
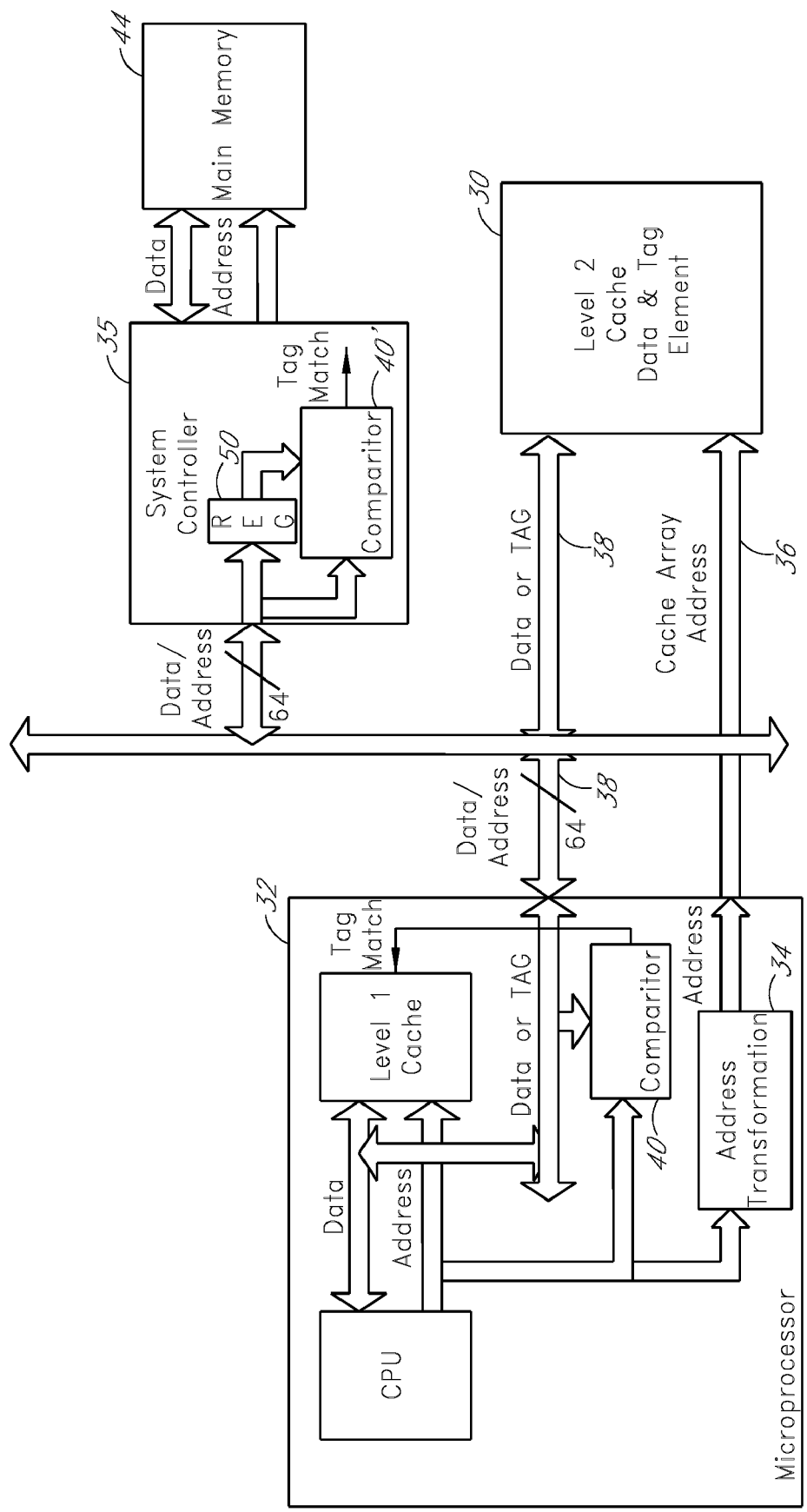
FIG. 6 illustrates an implementation of an off-chip cache memory system according to another embodiment of the invention.

FIG. 6 is identical to FIG. 5 except that the tag comparison function in the microprocessor 32 is shown duplicated in the system controller 35. Other aspects of the system controller are not shown. Duplicating the comparison function in the system controller 35 allows for the system controller to make an earlier determination of tag match than would otherwise be possible in this system. Since the comparison circuitry is very small, this can be done at an insignificant cost. Note that the system controller 35 need not be aware of the address transformation performed by the processor 32 for distinguishing tag and data accesses.

One aspect of the invention is thus a system controller 35 that includes tag comparison circuitry, as described above, for supporting the disclosed cache architecture. Another aspect of the invention is a microprocessor that includes address transformation and tag comparison circuitry, as described above.

The address transformation circuit 34 shown as part of the microprocessor in FIG. 5 and FIG. 6 provides an important distinction over prior designs. Unlike prior art systems, the tag and data elements of the cache are not accessed simultaneously. Instead, the tag is first accessed using a tag address, followed by one or more data accesses using data addresses. The main memory address as supplied by the CPU is transformed into either a tag or data address depending on which element is being accessed. The transformation function has the following characteristics in the preferred embodiment:

Tag and data addresses are distinct.

Any two memory addresses which are transformed to the same data address are also transformed to the same tag address.

The external tag/data RAM array uses as its address the transformed tag address and transformed data address for the corresponding access. No address bits that are modified by these transformations are excluded from connection to the external RAM array, though address bits that remain unchanged by either transformation may be excluded from connection to the tag/data RAM array for a smaller size cache.

One simple transformation function would be to dedicate a single address bit that is one for tag accesses and zero for data accesses. This would allocate half of the array for tags and half of the array for data. In the embodiment described below, one-fourth of the tag/data RAM array is allocated to tags and three/fourths of the array is utilized for data.

RM7000C Embodiment

To illustrate one particular embodiment of the invention, the cache architecture of the RM7000C™ microprocessor of PMC-Sierra, Inc. will now be described with reference to FIG. 6.

The RM7000C microprocessor provides support for an external cache implementation using the current invention under the name "EZ Cache™." The implementation supports caches of 2 megabytes or larger, and uses an address mapping function which allows for three fourths of the external cache (RAM bank 30) to be used for data and on fourth of the cache RAMs to be used for tags. In the RM7000C implementation, the address of the external cache RAMs is provided by the interface pins TCLINE[20:0] and TCWORD[1:0]. This range of address bits allows for a cache size of up to 64 megabytes. Of these address bits, only TCLINE[15:14] and TCWORD[1:0] are altered by the address mapping function. The address mapping used is as follows:

The processor 32 provides a 36-bit real memory address ADDR[35:0] which is used to access the main memory 44 of the system. The address of the cache memory array 30 is formed by first selecting a range of ADDR[35:0] as the line address. Specifically, ADDR[25:5] becomes the cache line address LINE[20:0]. This cache line address takes the place of the address used to access both the cache data RAMs and the cache tag RAMs in prior art designs. In the current implementation, this cache line address is transformed by a mapping function to provide unique addresses for separate tag and data accesses of a single cache RAM array 30. Further, a portion of the memory address is designated for selection of the double word within the cache line. Specifically ADDR[4:3] becomes WORD[1:0] where WORD[1:0] designates a specific double word in the line of the cache.

Cache data accesses translate LINE[20:0] and WORD[1:0] to TCLINE[20:0] and TCWORD[1:0] as follows:
1. LINE[20:16,13:0] maps directly to TCLINE[20:16,13:0].
2. TCLINE[15:14] becomes LINE[15:14] if LINE[15:14] equals '00' or '01'.
3. TCLINE[15:14] becomes '10' if LINE[15:14] equals '10' or '11'.
4. WORD[1:0] maps directly to TCWORD[1:0].

Cache tag accesses translate LINE[20:0] and WORD[1:0] to TCLINE[20:0] and TCWORD[1:0] as follows:
1. LINE[20:16,13:0] maps directly to TCLINE[20:16,13:0].
2. TCLINE[15:14] becomes '11'.
3. TCWORD[1:0] becomes LINE[15:14] if LINE[15:14] equals '00' or '01'.
4. TCWORD[1:0] becomes '10' if LINE[15:14] equals '10' or '11'.

With the address mapping function as described above, the three-fourths of the cache used for data accesses corresponds to TCLINE[15:14] being either '00', '01', or '10'. The one-fourth of the cache used for data accesses corresponds to TCLINE[15:14] being '11'. In the RM7000C implementation, the same bits (TCLINE[15:14] and TCWORD[1:0]) are modified by the address mapping function regardless of the size of the cache memory being implemented. In alternative implementations, different bits may be modified, including different bits being modified for different size caches.

Cache accesses consist of a series of accesses to the cache RAM array 30. The tag associated with the memory address is first accessed using the tag address. This provides a tag address which the processor's comparator 40 compares with the memory address to determine, in conjunction with the tag valid bit, whether the requested data resides in the external cache 30.

Concurrent with checking the tag for an address match condition, the cache data accesses are started. Data accesses consist of a series of four accesses to the cache array 30, one for each double word of the line. The TCLINE used for each of the four accesses is the data address as described above. The TCWORD is sequenced so that all four double words of the tag line are retrieved if the data is present. If the tag comparison indicates a cache miss, the sequencing of data accesses is suspended, and data is retrieved instead from the system main memory 44.

In the current embodiment, the processor 32 signals the system memory controller 35 that a cache tag access is being performed. The full memory address is supplied to the system memory controller 35 at the time of the tag access. This address is captured by the system memory controller 35, as represented by the register 50 in FIG. 6. When the tag is retrieved from the cache array 30, the system memory controller 35 compares the memory address from the cache 30 with the address captured from the processor 32 to make its own determination of the data present condition. The memory controller 35 may begin a main memory access in anticipation of a possible cache miss condition. The main memory access is completed only if the memory controller detects that the data was indeed not present in the cache.

Figure 7:
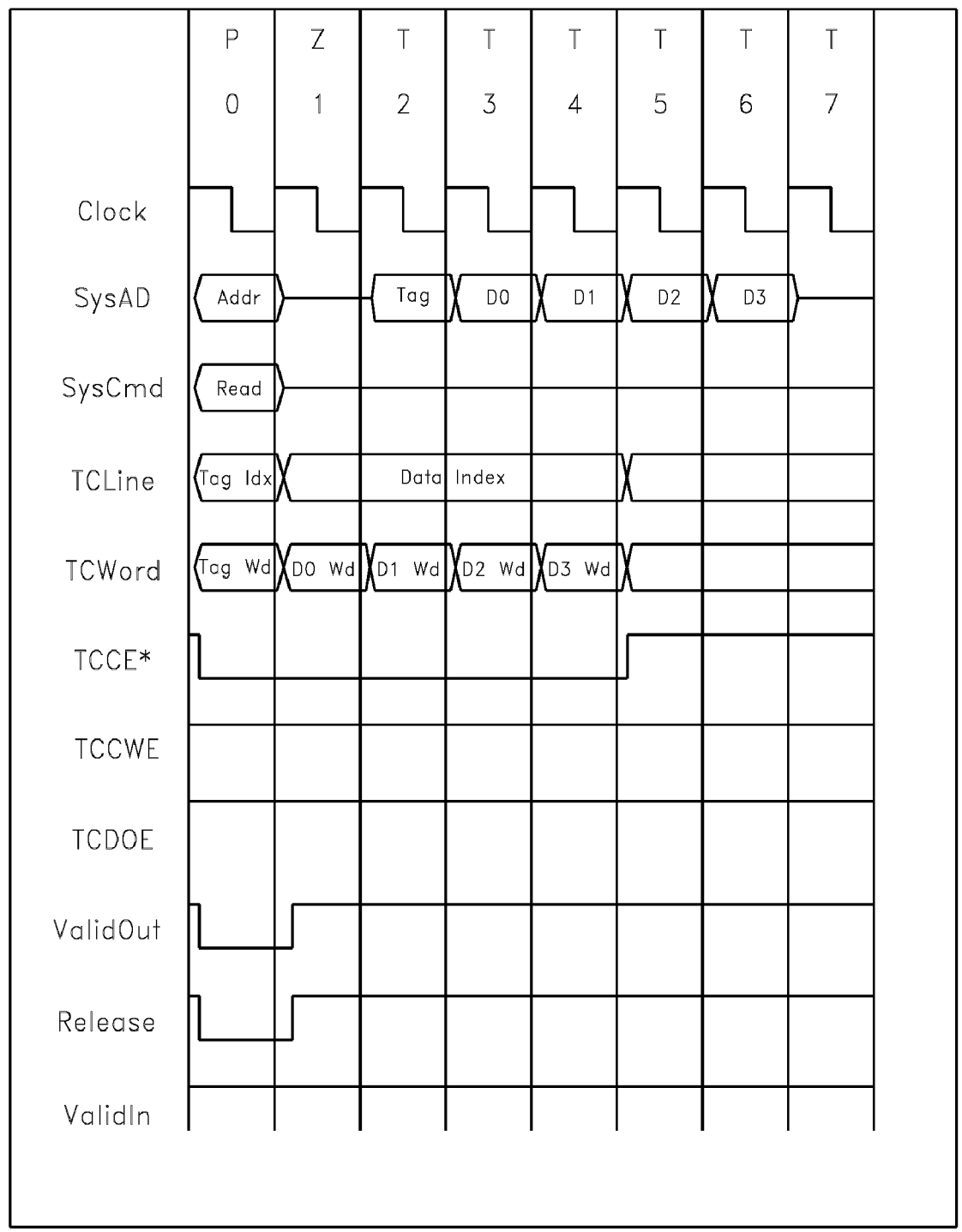
FIG. 7 is a timing diagram illustrating a cache read hit.
Figure 8:
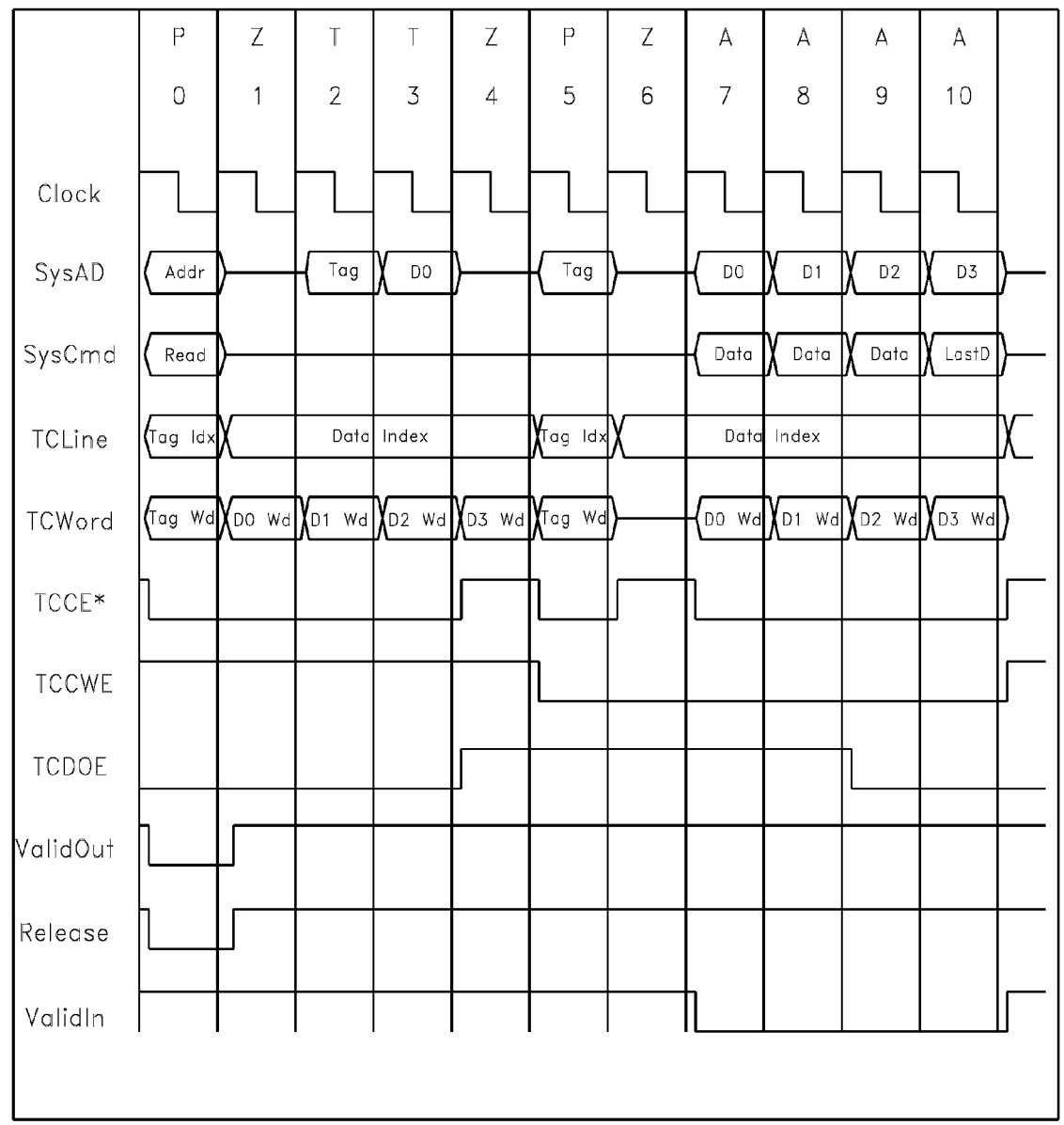
FIG. 8 is a timing diagram illustrating a cache read miss.

Timing diagrams illustrating a cache hit and a cache miss are shown in FIGS. 7 and 8, respectively.

SET ASSOCIATIVE EMBODIMENTS

The inventive concepts described above may also be used to implement a set associative cache using a single bank of memory chips. This may be accomplished by including multiple tag entries in the tag access (i.e. storing multiple tags and associated valid bits in a single addressable tag location in the memory bank), and by providing a circuit for identifying the location of the data in the memory bank depending on which of these tags, if any, matches the CPU-supplied memory address. Alternatively, a subsequent tag access could be performed in the event that the first tag access indicates a miss condition. The first of these methods is preferred in that it avoids the delay associated with performing multiple sequential tag read operations.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A system controller device adapted to be connected between a microprocessor and a main memory and to provide an interface to the main memory, the system controller device comprising:
   a memory interface circuit configured to receive a main memory address from the microprocessor over a bus that interconnects the microprocessor and the system controller device, and to use the main memory address to perform a memory read operation in which data is read from the main memory; and
   a cache tag comparison circuit configured to receive a cache tag value as the cache tag value is read by the microprocessor from an external cache memory that is external to the microprocessor and the system controller device, and to compare the cache tag value with the main memory address received by the memory interface circuit to determine whether the data associated with the memory read operation resides in said external cache memory;
   wherein the memory interface circuit is configured to begin the memory read operation before the cache tag comparison circuit compares the cache tag value with the main memory address, and the cache tag comparison circuit is further configured to prevent the memory interface circuit from completing the memory read operation if the comparison of the cache tag value with the main memory address reveals that said data resides in the external cache memory.

2. The system controller device of claim 1, wherein the cache tag comparison circuit is configured to receive the cache tag value over said bus after the memory interface circuit has received the main memory address over said bus.

3. The system controller device of claim 1 in combination with said microprocessor, wherein the microprocessor is configured to compare the cache tag value with the main memory address to make its own determination of whether said data is in the external cache memory.

4. In a system controller device that connects a microprocessor to a main memory, a method of supporting the microprocessor's use of an external cache memory, the method comprising:
   receiving and latching a main memory address supplied to the system controller device by the microprocessor for performing a main memory read operation;
   receiving a cache tag as the cache tag is read by the microprocessor from the external cache memory;
   with a comparison circuit of the system controller device, performing a comparison of the main memory address and the cache tag to assess whether data associated with the main memory read operation resides in the external cache memory; and
   aborting the main memory read operation if the comparison performed with said comparison circuit of the system controller device reveals that said data resides in the external cache memory;
   wherein the system controller device receives the main memory address and the cache tag over a common bus during different respective bus cycles.

5. The method of claim 4, wherein the comparison performed by the comparison circuit of the system controller device is redundant of, and performed in parallel with, a comparison performed by the microprocessor.

6. A microprocessor system, comprising:
   a microprocessor; and
   a system controller device adapted to be connected between the microprocessor and a main memory and to provide an interface to the main memory, the system controller device comprising:
      a memory interface circuit configured to receive a main memory address from the microprocessor over a bus that interconnects the microprocessor and the system controller device, and to use the main memory address to perform a memory read operation in which data is read from the main memory; and
      a cache tag comparison circuit configured to receive a cache tag value as the cache tag value is read by the microprocessor from an external cache memory that is external to the microprocessor and the system controller device, and to compare the cache tag value with the main memory address received by the memory interface circuit to determine whether the data associated with the memory read operation resides in said external cache memory;
      wherein the cache tag comparison circuit is further configured to prevent the memory interface circuit from completing the memory read operation if the comparison of the cache tag value with the main memory address reveals that said data resides in the external cache memory;
   wherein the microprocessor is configured to compare the cache tag value with the main memory address to make its own determination of whether said data is in the external cache memory.

7. The microprocessor system of claim 6, wherein the cache tag comparison circuit is configured to receive the cache tag value over said bus after the memory interface circuit has received the main memory address over said bus.

8. The microprocessor system of claim 6, wherein the memory interface circuit is configured to begin the memory read operation only if the comparison reveals that the data is not in the external cache memory.

9. In a system controller device that connects a microprocessor to a main memory, a method of supporting the microprocessor's use of an external cache memory, the method comprising:
   receiving and latching a main memory address supplied to the system controller device by the microprocessor for performing a main memory read operation;
   receiving a cache tag as the cache tag is read by the microprocessor from the external cache memory;
   with a comparison circuit of the system controller device, performing a comparison of the main memory address and the cache tag to assess whether data associated with the main memory read operation resides in the external cache memory; and
   aborting the main memory read operation if the comparison performed with said comparison circuit of the system controller device reveals that said data resides in the external cache memory;
   wherein the comparison performed by the comparison circuit of the system controller device is redundant of, and performed in parallel with, a comparison performed by the microprocessor.

* * * * *